Oct. 11, 1949.  P. K. RORVIK  2,484,186
ADJUSTABLE STAND FOR CHRISTMAS TREES
Filed July 22, 1948  2 Sheets-Sheet 1
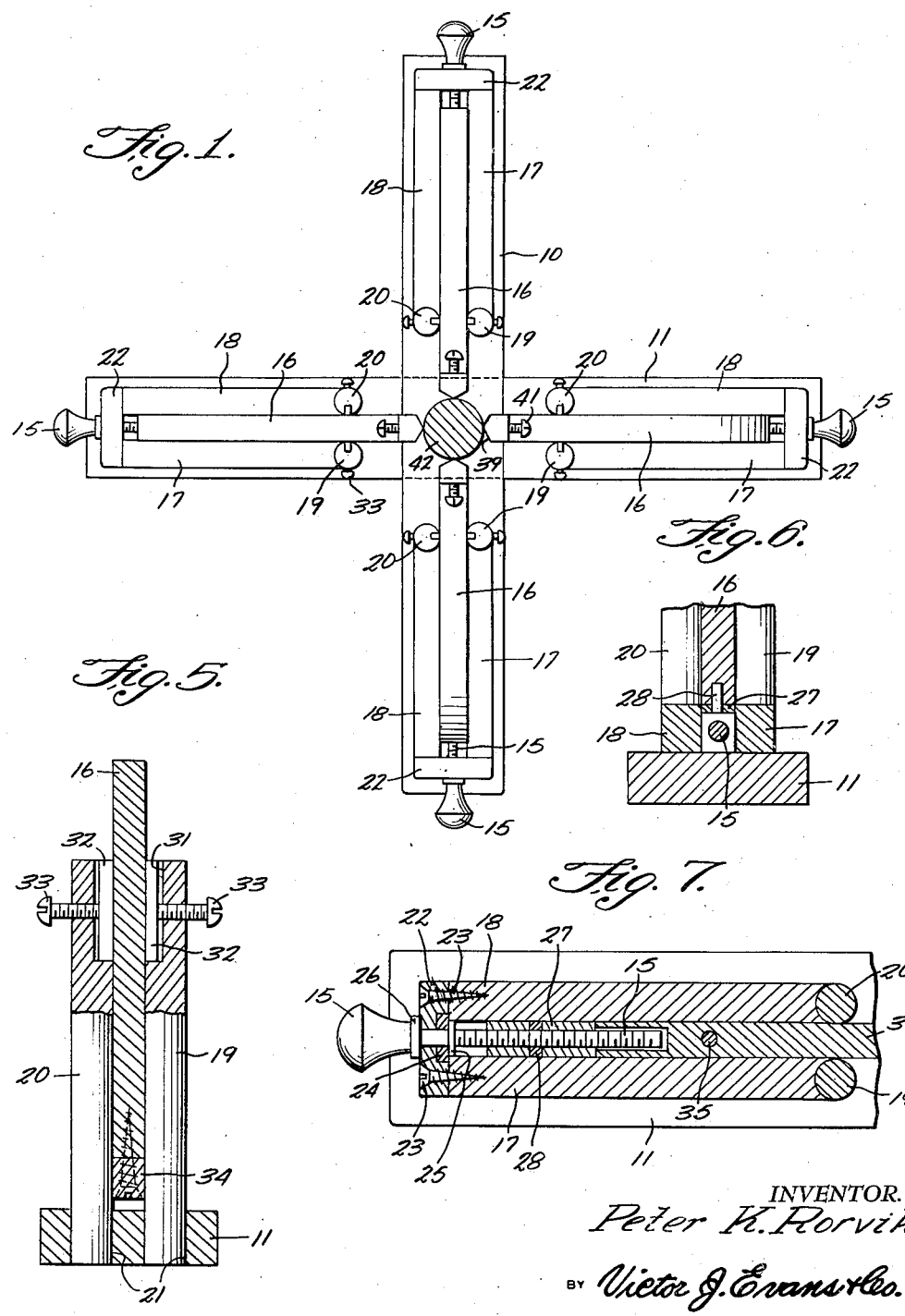
INVENTOR.
Peter K. Rorvik,
BY Victor J. Evans & Co.
ATTORNEYS Oct. 11, 1949.  P. K. RORVIK  2,484,186
ADJUSTABLE STAND FOR CHRISTMAS TREES
Filed July 22, 1948  2 Sheets-Sheet 2
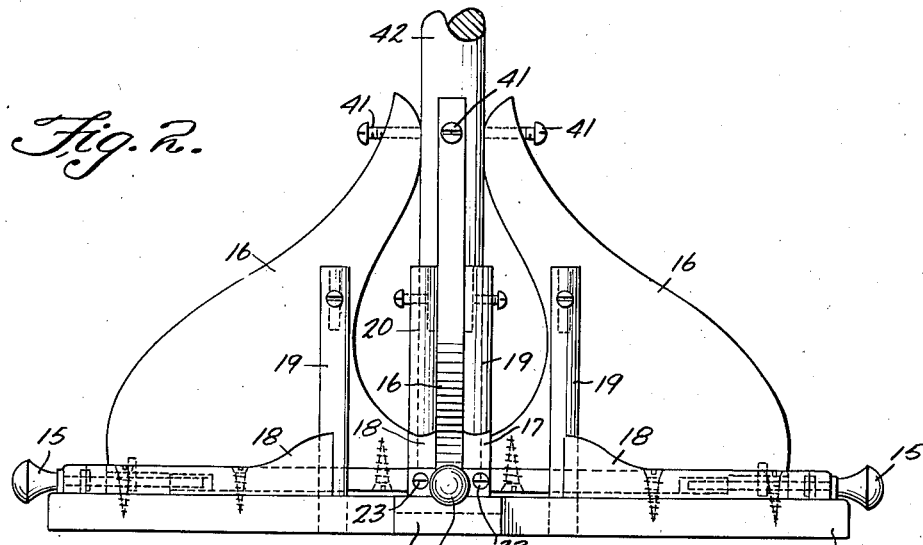
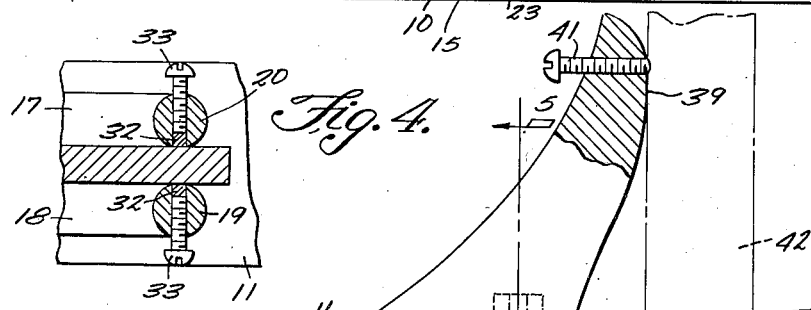
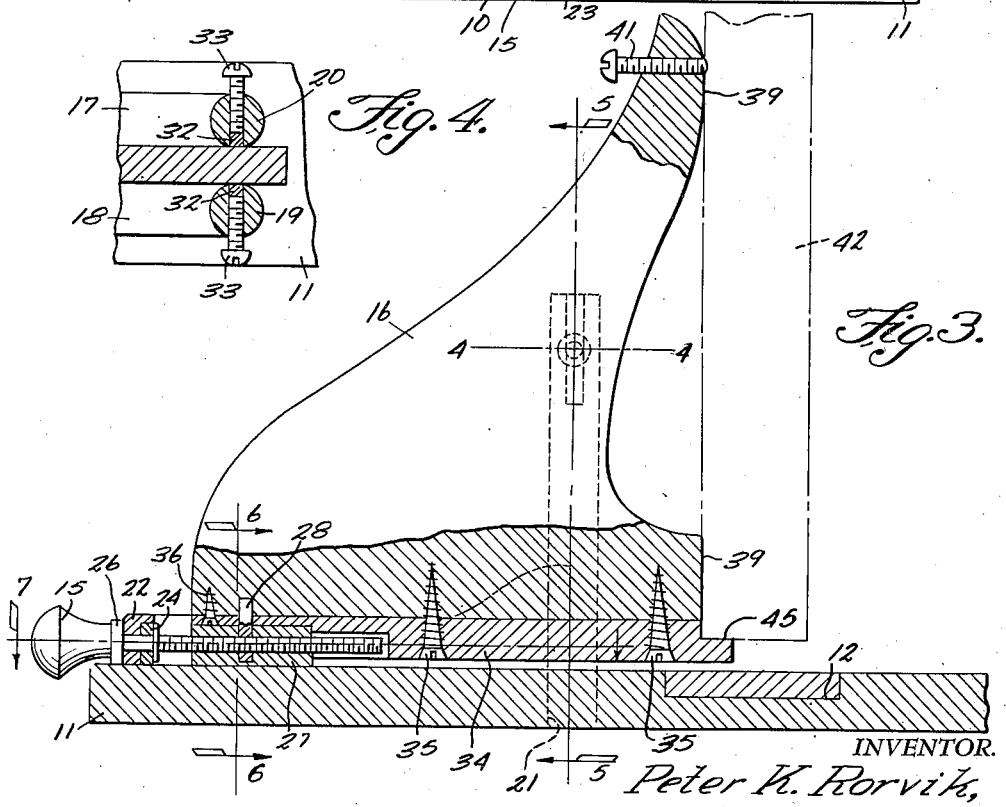
INVENTOR.
Peter K. Rorvik,
BY Victor J. Evans & Co.
ATTORNEYS Patented Oct. 11, 1949

2,484,186

UNITED STATES PATENT OFFICE 2,484,186

ADJUSTABLE STAND FOR CHRISTMAS TREES

Peter K. Rorvik, Missoula, Mont.

Application July 22, 1948, Serial No. 40,105

3 Claims. (Cl. 248—44)

This invention relates to an adjustable stand for Christmas trees or the like.

It is an object of the present invention to provide a stand having members adjustable to different lateral positions separately and by a hand screw in order to adapt the stand for different diameter trees and wherein the members can be locked in their adjusted positions and held against lateral movement and wherein the adjustable members engage the tree at two elevations with adjustable screws in one of the elevations, as at the upper ends of the members, used to make certain the contact of the members at both elevations.

Other objects of the present invention are to provide an adjustable stand for trees having the above features, which is of simple construction, inexpensive to manufacture, easy to adjust, has independently adjustable members and is efficient in operation.

For other objects and for a better understanding of the invention, reference may be had to the following detailed description taken in connection with the accompanying drawing, in which Fig. 1 is a top plan view of the stand adjusted for engagement with the tree.

Fig. 2 is a side elevational view of the stand.

Fig. 3 is a fragmentary and sectional view, in elevation, of one of the members and of the base.

Fig. 4 is a detail sectional view taken on line 4—4 of Fig. 3.

Figs. 5, 6 and 7 are respectively detail sectional views taken on lines 5—5, 6—6 and 7—7 respectively of Fig. 3.

Referring now to the figures, 10 and 11 represent crossed members serving as the base portion. These members are cut to provide recesses as indicated at 12 so that the members may receive one another and provide a flat base portion with the bottom faces of the members adapted to lie flush on the floor or other support.

On the outer ends of the members there are accessible hand screws 15 which may be turned to effect adjustment of vertically extending tree-engaging members 16. These members 16 extend between guides 17 and 18 which respectively have vertically extending posts 19 and 20 on their inner ends adapted to extend into holes 21 in the base portion. Connected across the outer ends of the guides is a retaining member 22 for the screw 15. This member is secured by wood screws 23 to the guides. The member 22 has a wear washer 24, Fig. 7, against which engages a flange 25 on the screw. This flange 25 and a flange 26 will react against the member 22 when the hand screw 15 is turned to cause a slide 27 on the screw and connected by a pin 28 with the tree engaging member to be moved and to thereby effect the engagement of the tree-engaging member.

On the upper ends of the vertically extending posts 19 and 20 are recesses 31 containing respectively clamping plates 32, Fig. 5, which may be adjusted into tight engagement with the tree-engaging member 16 by screw 33.

It will be understood that the adjusting arrangement for each member 16 is the same. The member 16 is provided preferably with a shoe 34 which is secured by screws 35 and 36 to the bottom of the member, Fig. 4.

The engaging of the members 16 with the side of the tree is effected at two elevations as indicated at 38 and 39, Fig. 3. At the elevation 39, there is an adjustable screw 41 which can engage with the side of the tree and to insure a two-part engagement of the member 16 with the tree. The tree is indicated at 42.

Each guide 17 and 18 is secured to the crossed members by screws 43, Fig. 2. The shoe 34 may be notched at 45 to receive the lower end of the tree 42 whereby the lower end of the tree will be held slightly elevated from the base portion. If desired, the shoe 34 may be made of harder wood to assume the weight of the tree.

While various changes may be made in the detail construction, it shall be understood that such changes shall be within the spirit and scope of the present invention as defined by the appended claims.

I claim:

1. An adjustable tree stand comprising a base portion, tree-engaging elements connected to the base portion for slidable adjustment and adapted to have edgewise engagement with the side of a tree, guide members disposed on the opposite sides of each tree-engaging member and fixed to the base, and a hand screw on the base portion and acting upon the tree-engaging member to effect its adjustment, and vertically extending posts connected to the base portion and extending respectively upwardly along the sides of a tree-engaging member, each post having means adjustable into tight engagement with the sides of the member whereby to brace the upper end of the member.

2. An adjustable tree stand comprising a base portion, tree-engaging elements connected to the base portion for slidable adjustment and adapted to have edgewise engagement with the side of a tree, guide members disposed on the opposite sides of each tree-engaging member and fixed to the base, and a hand screw on the base portion and acting upon the tree-engaging member to effect its adjustment, and said tree-engaging member having its edge adapted to have two point engagement with the side of the tree, and an adjustable screw at the top of the member to insure the two point engagement.

3. An adjustable tree stand as defined in claim 1 and each of the tree-engaging members having its edge formed to have two point engagement with the side of the tree, and an adjusting screw at the top of the tree-engaging member to provide the contact of the member with the tree at that point.

PETER K. RORVIK.

REFERENCES CITED

The following references are of record in the file of this patent:

UNITED STATES PATENTS

| Number | Name | Date |
|---|---|---|
| 109,423 | King | Nov. 22, 1870 |
| 848,850 | Pissahl | Apr. 2, 1907 |
| 1,792,307 | Jensen | Feb. 10, 1931 |
| 2,250,361 | Cullinan | July 22, 1941 |